United States Patent
Zhu

(10) Patent No.: US 9,503,842 B2
(45) Date of Patent: Nov. 22, 2016

(54) TECHNIQUES TO SUPPORT INTEGRATED BLUETOOTH/3GPP RADIO ACCESS TECHNOLOGIES

(71) Applicant: Intel Corporation, Santa Clara, CA (US)

(72) Inventor: Jing Zhu, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 14/671,788

(22) Filed: Mar. 27, 2015

(65) Prior Publication Data

US 2016/0286340 A1    Sep. 29, 2016

(51) Int. Cl.
| | |
|---|---|
| H04B 5/00 | (2006.01) |
| H04B 7/00 | (2006.01) |
| H04M 1/00 | (2006.01) |
| H04W 4/00 | (2009.01) |
| H04W 76/04 | (2009.01) |
| H04W 72/04 | (2009.01) |
| H04L 29/06 | (2006.01) |

(52) U.S. Cl.
CPC .......... *H04W 4/008* (2013.01); *H04L 63/0428* (2013.01); *H04W 72/0453* (2013.01); *H04W 76/046* (2013.01)

(58) Field of Classification Search
CPC .................................................... H04W 4/008
USPC ........................................................ 455/41.2
See application file for complete search history.

(56) References Cited

U.S. PATENT DOCUMENTS

| | | | | |
|---|---|---|---|---|
| 8,995,299 | B2* | 3/2015 | Comeau | H04L 5/0098 370/252 |
| 9,014,712 | B2* | 4/2015 | Tapia | H04W 16/32 455/449 |
| 9,264,987 | B2* | 2/2016 | Bennett | H04W 36/08 |
| 9,288,742 | B2* | 3/2016 | Etemad | H04B 7/0632 |
| 2005/0266798 | A1* | 12/2005 | Moloney | H04L 63/0435 455/41.2 |
| 2007/0093207 | A1* | 4/2007 | Kim | H04L 63/0492 455/41.2 |
| 2014/0043979 | A1* | 2/2014 | Etemad | H04B 7/2656 370/237 |
| 2014/0369201 | A1 | 12/2014 | Gupta et al. | |

FOREIGN PATENT DOCUMENTS

WO    2014168427 A1    10/2014

OTHER PUBLICATIONS

Bluetooth Special Interest Group, "Specification of the Bluetooth System," Core Version 4.2, Dec. 2, 2014.
International Search Report and Written Opinion of corresponding PCT Application PCT/US2016/019888 with mailing date of May 19, 2016.

(Continued)

*Primary Examiner* — Tilahun B Gesesse

(57) ABSTRACT

An integrated Radio Access Technology (RAT) architecture may include 3rd Generation Partnership Project (3GPP) and Bluetooth links. Configuration information for the Bluetooth link may be provided over the 3GPP link to assist in the setting up and/or usage of a Bluetooth Low Energy (BLE) link. Bearer traffic that may normally be transmitted over the 3GPP link may be offloaded to the BLE link in a manner that is seamless and transparent to the 3GPP core network elements (e.g., the serving gateway (SGW) and packet data network gateway (PGW)).

20 Claims, 12 Drawing Sheets

(56) References Cited

OTHER PUBLICATIONS

Hua et al, "Analysis of the Packet Transferring in L2CAP Layer of Bluetooth v2.x+EDR", Proceedings of the 2008 IEEE International Conference on Information and Automation, Jun. 20, 2008.

Ivanov, "Supersymmetry at BLTP: How It Started and Where We Are", ARXIV.ORG, Cornell University Library, Sep. 25, 2006.

Chakraborty et al., "Analysis of the Bluetooth Device Discovery Protocol", Wireless Networks; The Journal of Mobile Communication, Computation and Information, vol. 16 No. 2, Oct. 15, 2008.

* cited by examiner

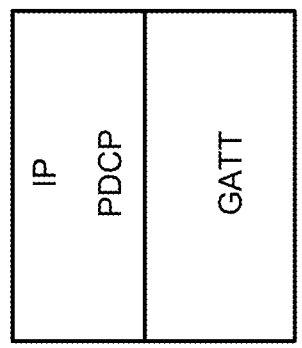

TECHNIQUES TO SUPPORT INTEGRATED BLUETOOTH/3GPP RADIO ACCESS TECHNOLOGIES

BACKGROUND

Growth in data traffic driven by smart phone devices, tablets, etc. can strain the capacity of wireless networks. One approach, used by the wireless industry, to address the growth in data traffic has been network densification, wherein small cells are used to increase reuse of licensed spectrum, which continues to be scarce and expensive. Additionally, network operators have also increasingly utilized unlicensed spectrum (e.g., WiFi spectrum) to cope with the increasing capacity demand.

One industry trend facilitating greater cooperation across licensed and unlicensed radio networks is the adoption and deployment of integrated multi-radio small cells with unlicensed and licensed radio spectrum interfaces, which may (i.e. co-located) or may not (i.e. non co-located) be physically integrated in the same system. Integrated cells allow for leveraging common infrastructure and site locations, and reducing the operational and capital expenditures of network operators. As networks move towards smaller cell sizes, the footprints of licensed and unlicensed coverage may increasingly overlap, making such deployments feasible.

BRIEF DESCRIPTION OF THE DRAWINGS

Embodiments of the present invention will be readily understood by the following detailed description in conjunction with the accompanying drawings. To facilitate this description, like reference numerals may designate like structural elements. Embodiments of the invention are illustrated by way of example and not by way of limitation in the figures of the accompanying drawings.

FIG. 9 is a diagram illustrating an example of a protocol stack using option in which each EPS bearer may be assigned a unique GATT service UUID;

DETAILED DESCRIPTION OF PREFERRED EMBODIMENTS

Figure 1:
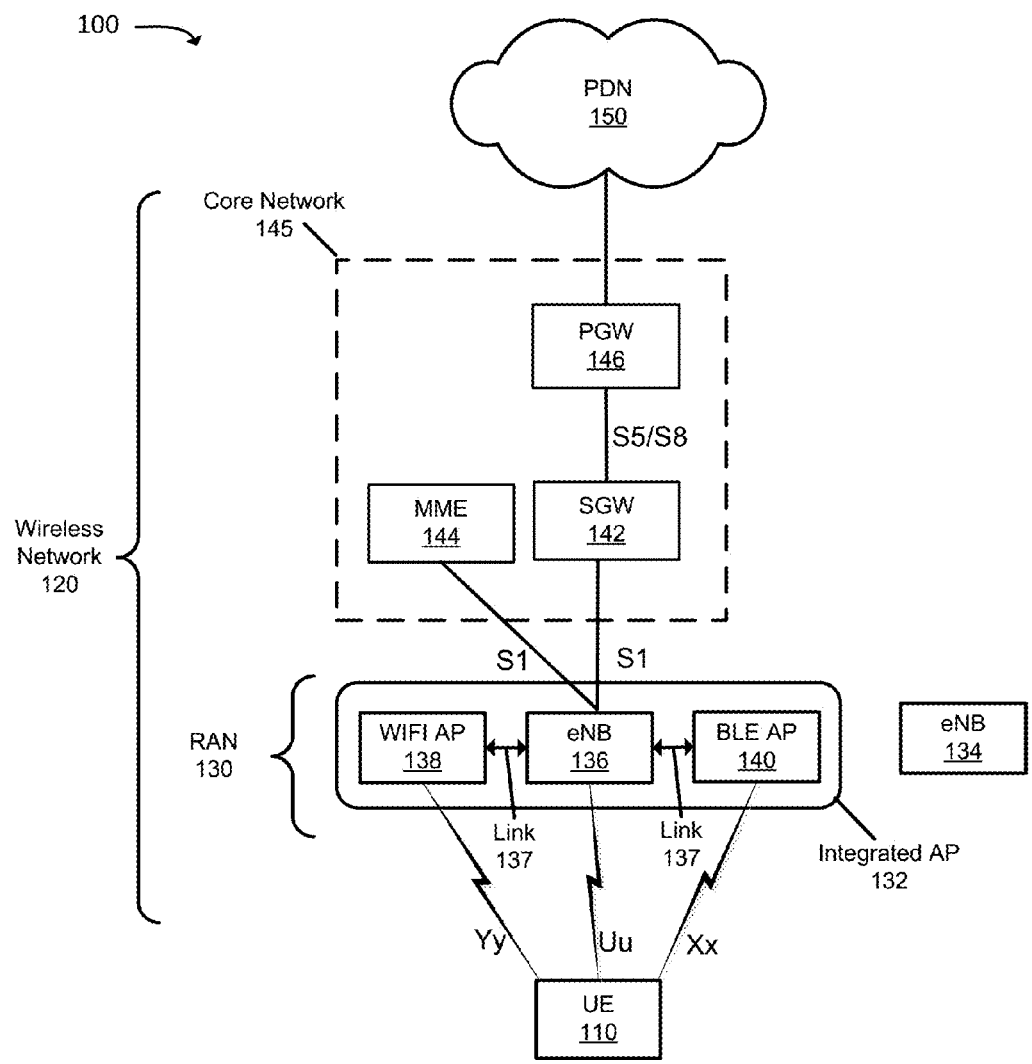
FIG. 1 is a diagram of an example environment in which systems and/or methods described herein may be implemented.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present invention is defined by the appended claims and their equivalents.

As used herein, a "wireless local area network (WLAN)" may refer to a wireless computer network that links two or more devices using a wireless distribution method that includes relatively short ranges. WLANs are typically implemented using unlicensed radio spectrum (i.e., radio frequencies that can be used without a license from a controlling government entity). One example of a radio technology that can be used to implement a WLAN is the Bluetooth® wireless standards, such as Bluetooth Low Energy (BLE), managed by the Bluetooth Special Interest Group (SIG). Bluetooth communications may use the radio frequency band from 2.4-2.485 gigahertz (GHz). Another example of a radio technology that can be used to implement a WLAN is WiFi (i.e., using Institute of Electrical and Electronics Engineers (IEEE) 802.11-based standards).

In contrast to WLANs, Wireless Wide Area Networks (WWANs), as used herein, may refer to networks that provide wireless access over larger areas. From the user's perspective, the WWAN coverage may be provided seamlessly over a number of cells, in the cellular network, to potentially create a large area of uninterrupted network coverage. One example of a WWAN is a cellular radio network, implemented using licensed frequency spectrum, based on 3rd Generation Partnership Project (3GPP) Long Term Evolution (LTE) standards.

An integrated WLAN/WWAN Radio Access Technology (RAT) architecture is described herein. The integrated architecture may include a network controlled framework for WLAN/WWAN integration, in which configuration information or other information may be provided over the 3GPP WWAN link to assist in the setting up and/or usage of a BLE link. Bearer traffic that may normally be transmitted over the 3GPP link may be offloaded to the BLE link in a manner that is seamless and transparent to the 3GPP core network elements (e.g., the serving gateway (SGW) and packet data network gateway (PGW)). The BLE link may be particularly useful for low power and/or low cost Machine Type Communications (MTC) or Internet of Things (IoT) applications.

In one implementation, a UE may comprise a first radio component to form a radio link using licensed frequency spectrum; a second radio component to implement a Bluetooth link using unlicensed frequency spectrum. The UE may further comprise processing circuitry to: receive, via the link using licensed frequency spectrum, parameters relating to discovery and pairing protocols regarding the Bluetooth link; control the second radio component, based on the received parameters, to form the Bluetooth link; and transmit an encapsulated packet over the Bluetooth link to offload data transfer from the link using licensed frequency spectrum to the Bluetooth link.

In some implementations, the parameters relating to the discovery and pairing protocols may be received, via the link using licensed frequency spectrum, using radio resource control (RRC) layer signaling. In some implementations, the parameters relating to the discovery protocol may include an indication of an advertising start time and advertising interval applicable to a Bluetooth discovery process.

In some implementations, the parameters relating to the pairing protocol may include a Bluetooth 128-bit temporary key (TK). Alternately of additionally, the parameters relating to the pairing protocol may include an indication of a Bluetooth short term key (STK) generation technique.

In some implementations, the processing circuitry may be further to: receive, via the link using licensed frequency spectrum, per evolved packet system (EPS) bearer Bluetooth access addresses; and encapsulate the packets using the per EPS bearer access addresses to identify a particular packet as belonging to a particular EPS bearer. Alternatively or additionally, in some implementations, the processing circuitry may be further to: receive, via the link using licensed frequency spectrum, per EPS bearer Bluetooth logical link control and adaptation protocol (L2CAP) channel identifiers (CIDs); and encapsulate the packets using the per EPS bearer L2CAP CIDs to identify a particular packet as belonging to a particular EPS bearer. Alternatively or additionally, in some implementations, the processing circuitry may be further to: receive, via the link using licensed frequency spectrum, per EPS bearer Bluetooth Tunneling Protocol (BLTP) and Bearer identifiers; and encapsulate the packets using the per EPS bearer BLTP and Bearer identifiers to identify a particular packet as belonging to a particular EPS bearer. Alternatively or additionally, in some implementations, the processing circuitry may be further to: receive, via the link using licensed frequency spectrum, per EPS bearer Generic Attribute Profile (GATT) service Universally Unique Identifiers (UUIDs); and encapsulate the packets using the per EPS bearer GATT service to identify a particular packet as belonging to a particular EPS bearer.

In another implementation, an integrated access point may comprise a Bluetooth Low Energy (BLE) access point; and an evolved NodeB (eNB) that provides an air interface for a Wireless Wide Area Network (WWAN), the eNB being coupled to the BLE access point via a low latency interface, the eNB to: transmit, to a UE, parameters used in protocols associated with wireless communications performed using the BLE access point; wherein the BLE access point is to: establish a BLE link with the UE based on the transmitted parameters; and receive, over the established BLE link, BLE packets that encapsulate WWAN packets.

In some implementations, the received BLE packets may include information identifying bearer traffic flows associated with the WWAN. Alternatively or additionally, the parameters may relate to BLE discovery and pairing protocols. Alternatively or additionally, the parameters may be transmitted via radio resource control (RRC) layer signaling. Alternatively or additionally, the parameters may relate to the discovery protocol include an indication of an advertising start time and advertising interval applicable to a BLE discovery process.

In another implementation, a UE may comprise a first component to connect to a WWAN; a second component to connect to a WLAN formed based on a BLE connection; and computer-readable media to store instructions for execution by a processor. The UE may further comprise one or more processors to execute the instructions to: receive, by the first component and from a network device associated with the WWAN, information relating to connecting to the WLAN; perform wireless discovery, by the second component and based on the information, of a WLAN access point; pair, by the second component and based on the information, with the WWAN access point; and transmit, using the second component, WWAN packets to the WLAN access point.

In another implementation, a method, UE, may comprise: receiving, via a 3rd Generation Partnership Project (3GPP) radio link using licensed frequency spectrum, parameters relating to discovery and pairing protocols regarding a Bluetooth link; establish, based on the received parameters, a Bluetooth radio link; and transmit encapsulated 3GPP packets, over the Bluetooth radio, link to offload data transfer from the 3GPP link to the Bluetooth link.

In another implementation, a device may comprise: means to receive, via a 3rd Generation Partnership Project (3GPP) radio link using licensed frequency spectrum, parameters relating to discovery and pairing protocols regarding a Bluetooth link; means to establish, based on the received parameters, a Bluetooth radio link; and means to transmit encapsulated 3GPP packets, over the Bluetooth radio, link to offload data transfer from the 3GPP link to the Bluetooth link.

FIG. 1 is a diagram of an example environment 100 in which systems and/or methods described herein may be implemented. As illustrated, environment 100 may include user equipment (UE) 110, which may obtain network connectivity from wireless network 120. Although a single UE 110 is shown for simplicity in FIG. 1, in practice, multiple UEs 110 may operate in the context of wireless network 120. Wireless network 120 may provide access to one or more external networks, such as packet data network (PDN) 150. The wireless network may include radio access network (RAN) 130 and core network 145. RAN 130 may include an evolved packet system (EPS) that includes a LTE network that operates based on a 3GPP wireless communication standard. Some or all of RAN 130 may be associated with a network operator that controls or otherwise manages core network 145. Core network 145 may include an Internet Protocol (IP)-based network, such as a System Architecture Evolution (SAE) core network or a General Packet Radio Service (GPRS) core network.

UE 110 may include a portable computing and communication device, such as a personal digital assistant (PDA), a smart phone, a cellular phone, a laptop computer with connectivity to a cellular wireless network, a tablet computer, etc. UE 110 may also include non-portable computing devices, such as desktop computers, consumer or business appliances, or other devices that have the ability to wirelessly connect to RAN 130.

RAN 130 may represent a 3GPP access network that includes one or more access technologies. For example, RAN 130 may include base stations. In the context of an LTE-based access network, base stations may be referred to as evolved NodeBs (eNBs), and are illustrated as eNBs 134 and 136. Some of the eNBs, such as eNB 136, may be associated with an integrated access point (AP), such as integrated AP 132. Integrated AP 132, in addition to providing functionality associated with a traditional eNB, may also include one or more WLAN access points (WLAN AP) 138 and 140. In this example, the WLAN access points are particularly illustrated as WiFi AP 138 and BLE AP (also called "BLE Master" or "BLE Central") 140. Integrated AP 132 may provide RAN-based coordination and simultaneous use of the radio resources between different RATs (e.g., 3GPP cellular (WWAN), WiFi, and BLE).

In some implementations, integrated AP 132 may be implemented such that eNB 136, WiFi AP 138, and BLE AP 140 may be physically co-located as part of an integrated multi-radio small cell. Alternatively, WiFi AP 138 may be omitted and integrated AP 132 may include eNB 136 and BLE AP 140. Alternatively or additionally, integrated AP 132 may be implemented such that eNB 136 and BLE AP 140 (and/or WiFi AP 138) are physically separated but logically co-located, such as via an external, low latency standardized or proprietary interface that may be used to connect eNB 136 with WiFi AP 138 and/or BLE AP 140. In either case a proprietary or other type of low latency interface may be implemented between eNB 136 and WiFi AP 138/BLE AP 140. The coverage ranges of eNB 136, AP 138, and BLE AP 140 may be different and may or may not overlap.

Core network 145 may include an IP-based network. In the 3GPP network architecture, core network 145 may include an Evolved Packet Core (EPC). As illustrated, core network 145 may include serving gateway (SGW) 142, Mobility Management Entity (MME) 144, and packet data network gateway (PGW) 146. Although certain network devices are illustrated in environment 100 as being part of RAN 130 and core network 145, whether a network device is labeled as being in the "RAN" or the "core network" of environment 100 may be an arbitrary decision that may not affect the operation of wireless network 120.

SGW 142 may include one or more network devices that aggregate traffic received from eNB 134 and/or integrated AP 132. SGW 142 may generally handle user (data) plane traffic. MME 144 may include one or more computation and communication devices that perform operations to register UE 110 with core network 145, establish bearer channels associated with a session with UE 110, hand off UE 110 from one eNB to another, and/or perform other operations. MME 144 may generally handle control plane traffic. SGW 142 may include one or more network devices that aggregate traffic received from one or more eNodeBs 134/136. SGW 142 may generally handle user (data) plane traffic.

PGW 146 may include one or more devices that act as the point of interconnect between core network 145 and external IP networks, such as PDN 150, and/or operator IP services. PGW 146 may route packets to and from the access networks and the external IP networks.

PDN 150 may include a packet-based network. PDN 150 may include external networks, such as a public network (e.g., the Internet) or proprietary networks that provide services that are provided by the operator of core network 145 (e.g., IP multimedia (IMS)-based services, transparent end-to-end packet-switched streaming services (PSSs), or other services).

A number of communication interfaces, between various devices, are labeled in FIG. 1. The labeled communication interfaces may represent various protocols that are used to communicate between the various devices illustrated in FIG. 1. For example, eNBs 134 and 136 may communicate with SGW 142 using the 3GPP standardized S1 interface, and SGW 142 may communicate with PGW 146 using the 3GPP standardized S5/S8 interface.

Various interfaces between integrated AP 132 and UE 110 are also illustrated in FIG. 1. For example, the interface between WiFi AP 138 and UE 110 is illustrated as the Yy interface, the interface between eNB 136 and UE 110 is illustrated as the Uu interface, and the interface between BLE AP 140 and UE 110 is illustrated as the Xx interface.

Here, Yy refers to the point-to-point WiFi link between WiFi AP 138 and UE 110; Uu refers to a point-to-point 3GPP link (e.g., using licensed spectrum) between eNB 136 and UE 110; and Xx refers to the point-to-point BLE link between BLE AP 140 and UE 110. Aspects of the Xx interface are described herein. In particular, the following aspects of Xx will discussed below in detail:

(1) 3GPP RAN-assisted BLE discovery;
    (2) 3GPP RAN-assisted BLE pairing; and
    (3) 3GPP over BLE point-to-point (P2P) tunneling.

The quantity of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1. Alternatively, or additionally, one or more of the devices of environment 100 may perform one or more functions described as being performed by another one or more of the devices of environment 100.

Before Bluetooth (e.g., BLE) devices, that are in proximity to one another, can communicate, the devices may perform an initialization procedure, referred to as device discovery, in which the devices learn of the existence of one another and exchange information needed to form a communication link. The time required for the completion of the initialization procedure can be nontrivial and can negatively impact the communication link between BLE AP 140 and UE 110. Consistent with aspects described herein, the 3GPP link (i.e., the Uu interface), may be used to provide information to UE 110 to improve BLE device discovery.

In the Bluetooth discovery process, one device, called a "slave device," enters an Advertising State to periodically send out one or more advertising packet data units (PDUs) on an advertising radio channel. Control parameters, relating to the Advertising State, and used by the slave device may include the following: (1) advinterval; advDelay; and (3) advertising channel indices. The advinterval parameter may be assigned a value that is an integer multiple of 0.625 milli-seconds (ms) and be in the range of 20 ms to 10.24 seconds. The parameter is used, in conjunction with advDelay, to define the time between the start of two consecutive advertising events. In particular, the time between the start of two consecutive advertising events may be computed as follows: advinterval+advDelay. The parameter advertising channel indices may define the advertising radio channel that will be used to send the advertising PDUs.

Further, as part of the Bluetooth discovery process, a second device, called the "master device," enters an Initiating State to receive the advertising channel. A number of parameters may be used to control the discovery process performed by the master device. For example, the parameters may include the following: (1) scan Window; and (2) scanInterval. The scanWindow parameter may define a time period at which the master device listens on an advertising channel. The scanInterval parameter may define a time interval between the start of two consecutive scan windows.

In a typical Bluetooth discovery process, the master (e.g., BLE AP 140) and slave (e.g., UE 110) devices configure their respective parameters independently. This may potentially lead to a relatively long time to complete the discovery process.

Figure 2:
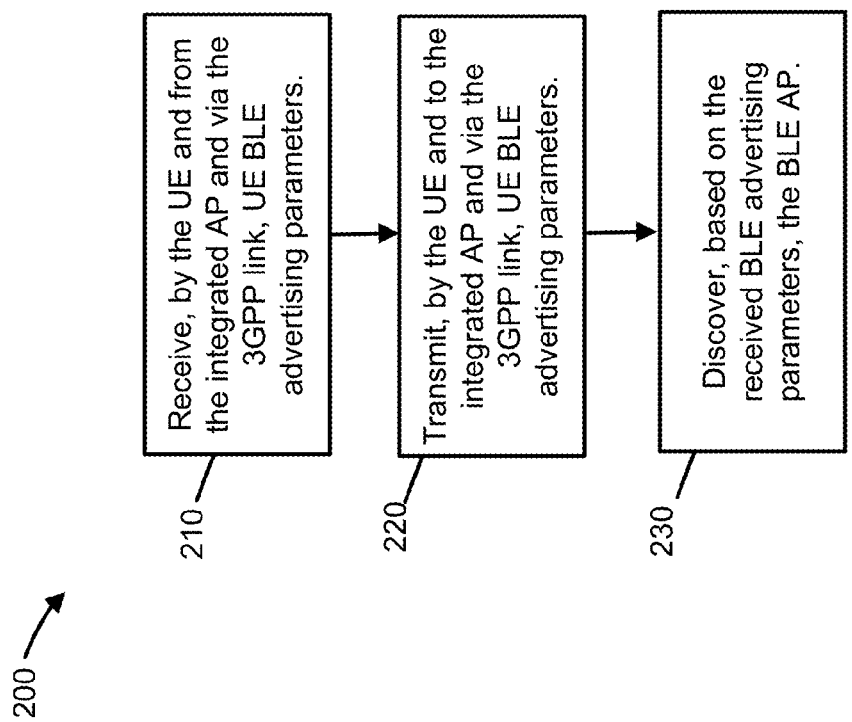
FIG. 2 is a flow chart illustrating an example process relating to supporting integrated Bluetooth Low Energy (BLE)/3GPP radio access technologies.

FIG. 2 is a flow chart illustrating an example process 200 relating to supporting integrated BLE/3GPP radio access technologies. Process 200 may be performed by, for example, UE 110. Process 200 may generally relate to 3GPP RAN-assisted BLE discovery (aspect (1) above).

Process 200 may include receiving, via the 3GPP link (e.g., via the Uu interface), UE BLE advertising parameters (block 210). The advertising parameters may include, for example, advinterval, advDelay, and the advertising channel indices parameters. In some implementations, the received advertising parameters may include additional parameters, such as a BLE device address associated with UE 110, an advertising start time at which UE 110 should begin advertising as part of BLE discovery, and/or an advertising duration value to indicate how long UE 110 should continue with device discovery. UE 110 may use the received parameters when performing BLE discovery. In this manner, because the advertising parameters are controlled by integrated AP 132, the master and slave advertising parameters may be matched to obtain an optimal discovery sequence.

eNB 136 and BLE AP 140 may communicate via link 137 to be synchronized with respect to the advertising parameters. For example, eNB 136 may generate the advertising parameters and provide the parameters to BLE AP 140 and UE 110. Alternatively, BLE AP 140 generate the advertising parameters and may communicate the parameters to eNB 136, which may forward the advertising parameters to UE 110. In another example, UE 110 may generate the advertising parameters and provide the parameters to eNB 136, which may forward the advertising parameters to BLE AP 140.

Process 200 may further include transmitting, via the 3GPP link, UE BLE advertising parameters from the UE to the eNB (block 220). The advertising parameters may include, for example, the device address of UE 110. eNB 136 may forward the received advertising parameter(s) to BLE AP 140. Exchanging the BLE device addresses between UE 110 and BLE AP 140 may allow BLE AP 140 and/or UE 110 to filter out unwanted advertising PDUs. In some implementations, the exchanging of the BLE device addresses may be omitted.

Process 200 may further include discovering, based on the received BLE advertising parameters, the BLE AP (block 230). The BLE discovery process may be performed using the values for the advertising parameters, as exchanged in blocks 210 and 220. Exchanging the advertising parameters prior to the BLE discovery process may potentially allow UE 110 and BLE AP 140 to establish a radio link relatively quickly.

BLE discovery may occur between UE 110 and BLE AP 140 (at 230). The BLE discovery may use standard BLE discovery techniques, which may use the exchanged advertising parameters.

Figure 3:
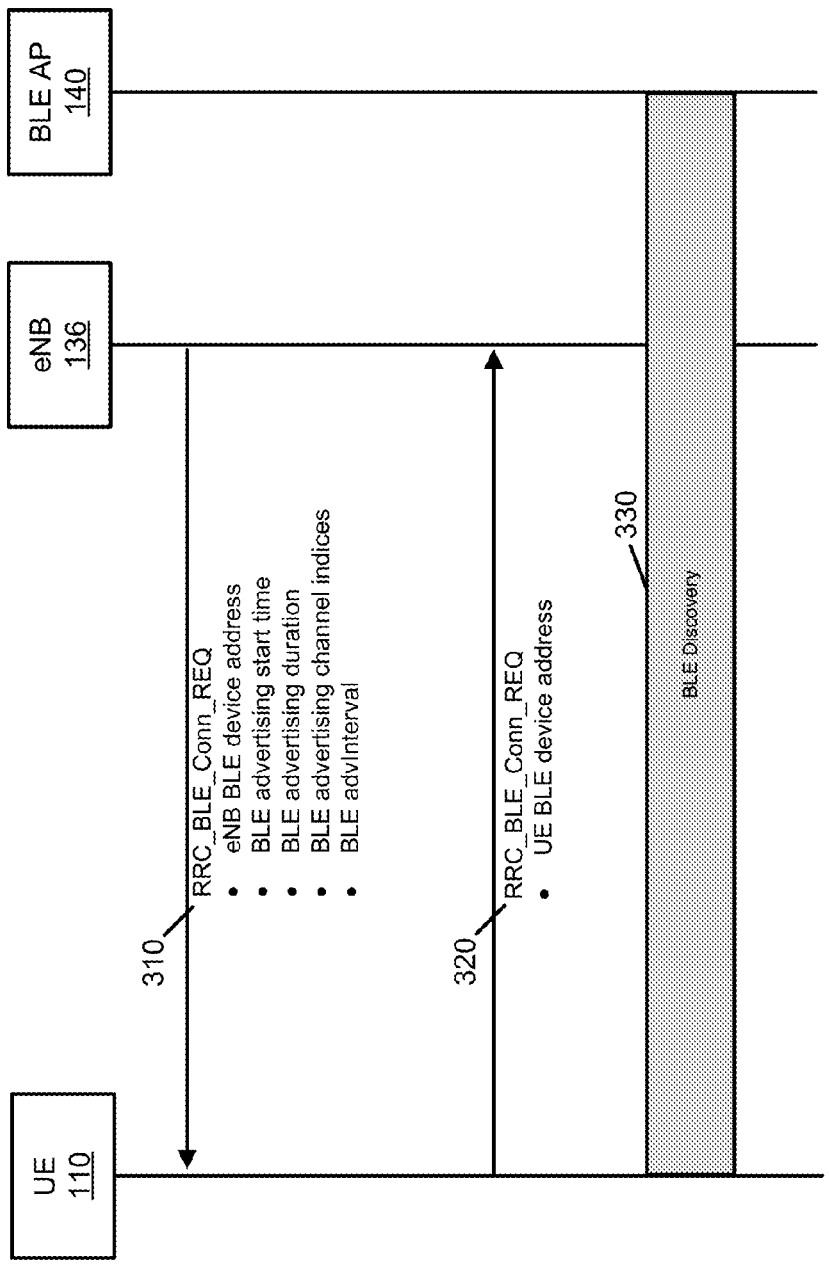
FIG. 3 is a diagram illustrating an example signal flow relating to exchanging parameters relating to BLE discovery.

FIG. 3 is a diagram illustrating an example signal flow relating to exchanging parameters relating to BLE discovery. The signaling shown in FIG. 3 may be performed between eNB 136 and UE 110 using the 3GPP link. In one implementation, the signaling may be performed using Radio Resource Control (RRC) layer messages.

As illustrated in FIG. 3, eNB 136 may transmit BLE advertising parameters to UE 110 (at 310), such as the advertising parameters discussed with respect to block 210 (FIG. 2). The advertising parameters may be included as information elements in a RRC layer message (shown as "RRC_BLE_Conn_Req" in FIG. 3). For example, in one implementation and as illustrated, the transmitted advertising parameters may include: (1) an eNB BLE device address (e.g., the BLE address associated with integrated AP 132, such as the BLE address of BLE AP 140); (2) a BLE advertising start time value (a time at which UE 110 should begin advertising as part of BLE discovery); (3) a BLE advertising duration value (a value indicating how long UE 110 should continue with device discovery); (4) BLE advertising channel indices (e.g., the previously discussed advertising channel indices parameter); and (5) a BLE advinterval value.

As is further illustrated in FIG. 3, UE 110 may transmit BLE advertising parameters to eNB 136 (at 320). For example, in one implementation, the transmitted advertising parameter may include the BLE device address of UE 110 (UE BLE device address). This parameter may be transmitted as part of an information element in a RRC layer message ("RRC_BLE_Conn_Req"). eNB 136 may transmit the advertising parameter, over link 137, to BLE AP 140. As previously mentioned, the device addresses may be used to filter out unwanted advertising PDUs.

Bluetooth device pairing may refer to the establishment of a radio connection between Bluetooth devices that have discovered one another. BLE pairing may involve the generation of two keys related to encrypting communications over the radio connection. The two keys are: (1) the Temporary Key (TK); and (2) the Short Term Key (STK). TK may be a 128-bit temporary key that is used in the pairing process to generate STK. STK may be a 128-bit key used to encrypt and decrypt data transmitted over the BLE radio link.

BLE defines three possible ways to distribute TK during the BLE pairing process:
  (1) Just Works. No key information is exchanged between the two BLE devices and TK is set at zero at both BLE devices.
  (2) Passkey Entry. TK is determined by six numeric digits that are received out-of-band by the BLE devices. In conventional BLE pairing, the six numeric digits may be entered by the user.
  (3) Out-of-Band. An out-of-band mechanism is used to communicate the 128-bit value of TK. Other information, such as the BLE device address, may also be provided out-of-band.

Figure 4:
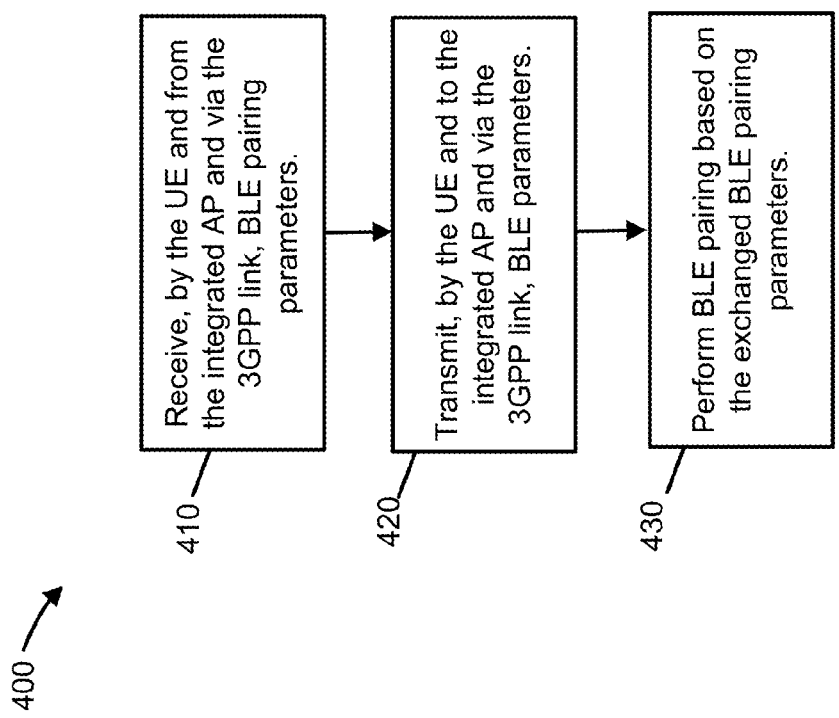
FIG. 4 is a flow chart illustrating another example process relating to supporting integrated BLE/3GPP radio access technologies.

FIG. 4 is a flow chart illustrating another example process 400 relating to supporting integrated BLE/3GPP radio access technologies. Process 400 may be performed by, for example, UE 110. Process 400 may generally relate to 3GPP RAN-assisted BLE pairing (aspect (2) above).

Process 400 may include receiving, via the 3GPP link (e.g., via the Uu interface), BLE pairing parameters (block 410). The pairing parameters may include, for example, the BLE device address associated with BLE AP 140 and the TK value to use. In one implementation, the TK value may be specified by an indication of the generation method for TK (e.g., Just Works, Passkey Entry, or Out-of-Band), and, when the generation method is Passkey Entry or Out-of-Band, the six digit numeric code or the 128-bit TK value, respectively.

Process 400 may further include transmitting, via the 3GPP link, BLE pairing parameters from the UE to the integrated AP (block 420). The pairing parameters may include, for example, the BLE device address of UE 110. eNB 136 may forward the received pairing parameter(s) to BLE AP 140.

Process 400 may further include performing BLE pairing, based on the exchanged BLE pairing parameters (block 430). For instance, the shared STK encryption key can be determined by UE 110 and BLE AP 140 based on the pairing parameters that were exchanged over the 3GPP link. This may provide for an efficient and non-intrusive (from the point of view of the user of UE 110) pairing process.

Figure 5:
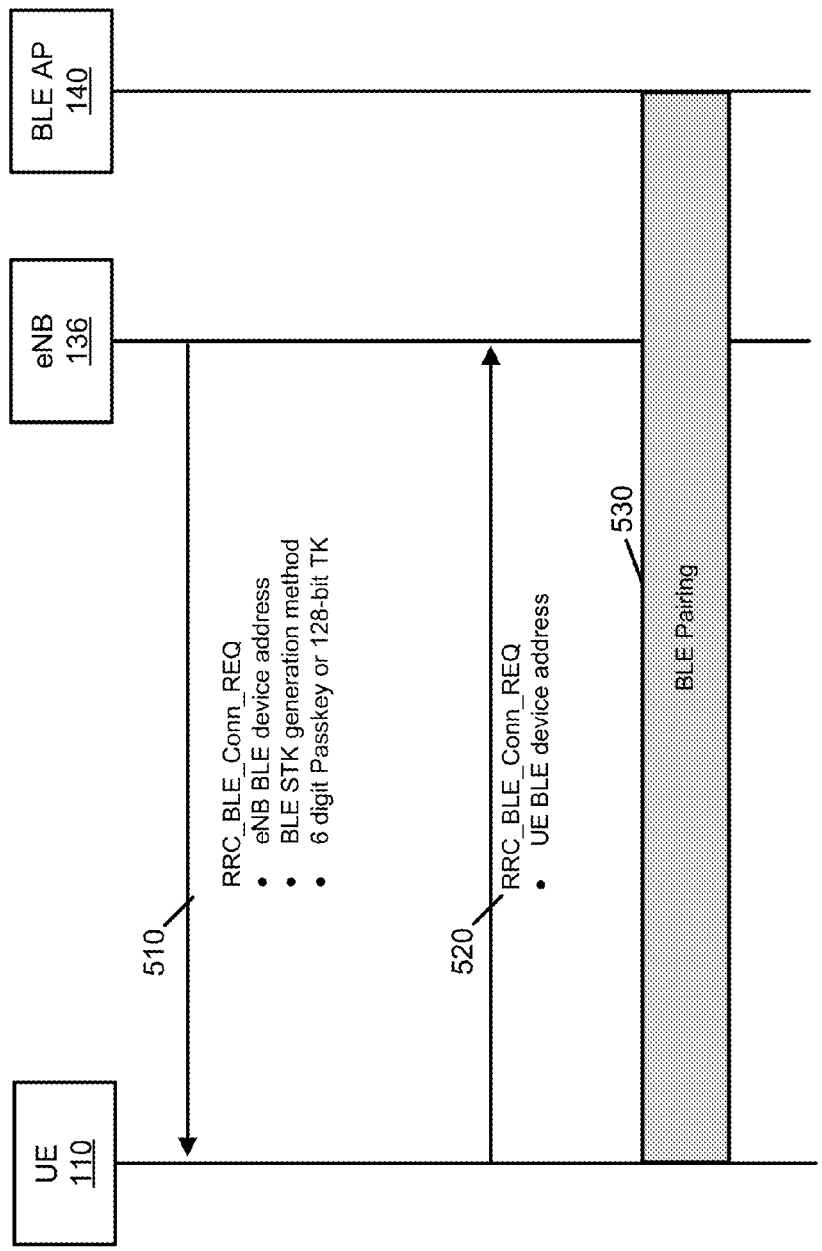
FIG. 5 is a diagram illustrating an example signal flow relating to exchanging parameters relating to BLE pairing.

FIG. 5 is a diagram illustrating an example signal flow relating to exchanging parameters relating to BLE pairing.

The signaling shown in FIG. 5 may be performed between eNB 136 and UE 110 using the 3GPP link. In one implementation, the signaling may be performed using RRC layer messages.

As illustrated in FIG. 5, eNB 136 may transmit BLE pairing parameters to UE 110 (at 510). The pairing parameters may be included as information elements in the RRC "RRC_BLE_Conn_Req" message. For example, in one implementation, the transmitted pairing parameters may include: (1) the BLE device address associated with integrated AP 132, such as the BLE address of BLE AP 140; (2) indication of the STK generation method (e.g., an indication of whether the STK generation method is based on the Just Works, Passkey Entry, or Out-of-Band method); and (3) when the STK generation method is Passkey Entry or Out-of Band, data corresponding to the indicated STK generation method. Stated more precisely, using pseudocode, the STK data may be determined as:

```
If STK_Generation_Method Equals Passkey_Entry
{
   six digit passkey;
}
Else If STK_Generation_Method Equals Out-of-Band
{
   128-bit TK;
}
```

As is further illustrated in FIG. 5, UE 110 may transmit BLE pairing parameters to eNB 136 (at 520). For example, in one implementation, the transmitted pairing parameter may include the BLE device address of integrated BLE AP 140. The parameter may be transmitted as part of the "RRC_BLE_Conn_Req" information element in the RRC layer message. eNB 136 may transmit the pairing parameter, over link 137, to BLE AP 140.

BLE pairing may occur between UE 110 and BLE AP 140 (at 530). The BLE pairing may use standard BLE pairing techniques, which may be based on the exchanged pairing parameters.

After pairing completes, UE 110 may communicate with BLE AP 140 to transmit 3GPP packets over BLE. In one implementation, the 3GPP packets may be communicated, via BLE, using a tunneling protocol that encapsulates the 3GPP packets within BLE P2P tunnels (aspect (3), above). The 3GPP packets may be associated with one or more EPS bearers.

In BLE, the BLE master device (e.g., BLE AP 140) may assign a 32-bit "Access Address" to each slave device (e.g., UE 110). The access address is used to uniquely identify a P2P link between slave and master. The Access Address may be determined by the master device when the BLE connection is established.

Consistent with aspects described herein, EPS bearers associated with UE 110 may be transmitted, to integrated AP 132, using one of the following three options: (1) per UE Access Address; (2) per bearer Access Address; or (3) per bearer GATT (Generic Attribute Profile). For option (1), UE 110 may be assigned one unique Access Address, and therefore one P2P link with integrated AP 132. All the EPS bearers of UE 110 will therefore share the same BLE link. In the situation, a mechanism may be needed to distinguish the different EPS bearers that share the same BLE link. As will be described in more detail below, in one implementation, the Bluetooth logical link control and adaptation protocol (L2CAP) channel identifier (CID) may be used to identify EPS bearers. Alternatively, in another possible implementation, a header field, referred to as a Bluetooth Tunneling Protocol (BLTP) header field, may be defined and used to identify different EPS bearers that share the same BLE link.

For option (2), each EPS bearer may be assigned a separate Access Address. UE 110 may therefore be associated with multiple logical BLE links.

For option (3), each EPS bearer may be assigned a unique GATT service UUID (Universal Unique Identifier). Each UE may therefore be associated with multiple GATT services.

Figure 6A:
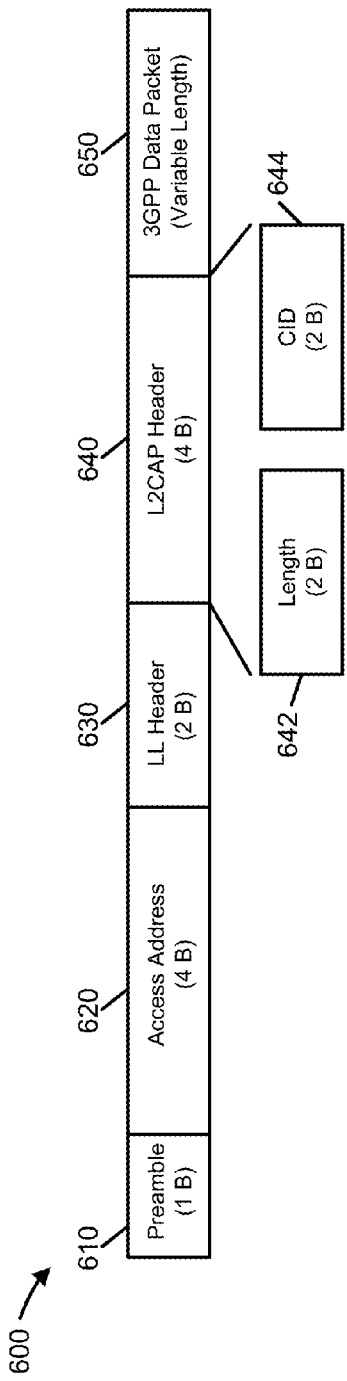
FIG. 6A is a diagram illustrating an example format of a user plane packet transmitted over the BLE link.

FIG. 6A is a diagram illustrating an example format of a user plane packet transmitted over the BLE link using option (1) and in which a L2CAP CID is used to identify EPS bearers. L2CAP may refer to a standardized Bluetooth protocol, at the logical link layer, to support multiplexing, packet segmentation and reassembly, and the conveying of quality of service information. L2CAP is based on the concept of "channels," where the CID may refer to the local name representing a logical channel endpoint on a Bluetooth device. In a standard Bluetooth implementation, CID assignment may be relative to a particular device and a device can assign CIDs independently from other devices. Consistent with aspects herein, the L2CAP CID may be used to identify a particular EPS bearer and the L2CAP CID may be provided, by integrated AP 132, to UE 110.

In FIG. 6A, packet 600 may include a preamble field 610, Access Address field 620, link layer (LL) header field 630, L2CAP header field 640, and 3GPP data packet field 650. As illustrated, preamble field 610 may be one byte (B) in length, Access Address field 620 may be four bytes in length, LL header field 630 may be two bytes in length, L2CAP header field 640 may be four bytes in length, and 3GPP data packet field 650 may encapsulate a variable length packet corresponding to the 3GPP data packet. L2CAP header field 640, as particularly illustrated, may include a two byte length field 642 and a two byte identifier (CID) field 644. CID field 614 may be assigned by integrated AP 132 and may identify particular EPS bearers associated with UE 110.

Figure 6B:
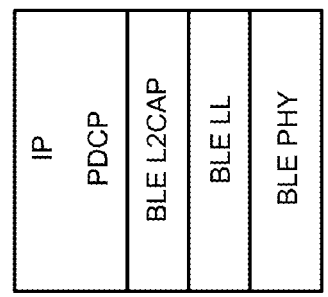
FIG. 6B is a diagram illustrating a protocol stack, corresponding to the packet of FIG. 6A, for BLE tunneling.

FIG. 6B is a diagram illustrating a protocol stack, corresponding to packet 600, for BLE tunneling. As illustrated, the protocol stack may include an IP/Packet Data Convergence Protocol (PDCP) layer, which may correspond to the 3GPP packet 650. Below the IP/PDCP layer may be the BLE L2CAP layer, the BLE LL layer, and the BLE Physical (PHY) layer.

Figure 7A:
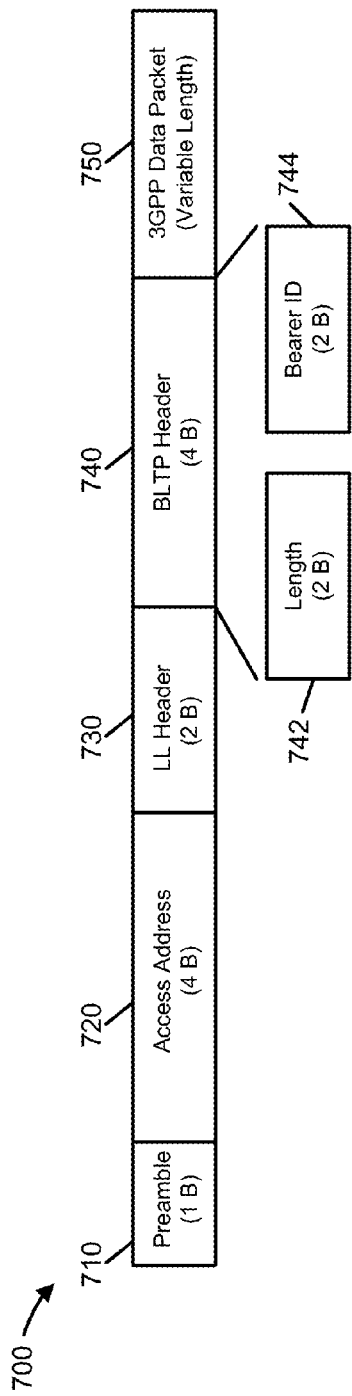
FIG. 7A is a diagram illustrating another example format of a packet transmitted over the BLE link.

FIG. 7A is a diagram illustrating an example format of a packet transmitted over the BLE link using option (1) and in which the BLTP field is used to identify EPS bearers. In FIG. 7A, packet 700 may include a preamble field 710, Access Address field 720, LL header field 730, BLTP header field 740, and 3GPP data packet field 750. As illustrated, preamble field 710 may be one byte in length, Access Address field 720 may be four bytes in length, LL header field 730 may be two bytes in length, BLTP header field 740 may be four bytes in length, and 3GPP data packet field 750 may encapsulate variable length packet corresponding to the 3GPP data packet. BLTP header field 740, as particularly illustrated, may include a two byte length field 742 and a two byte Bearer ID field 744. Bearer ID field 744 may be assigned by integrated AP 132 and may identify particular EPS bearers associated with UE 110.

Figure 7B:
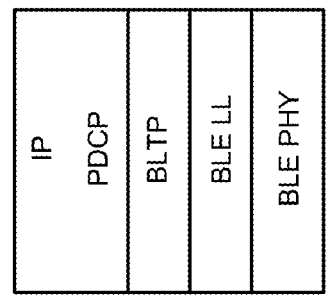
FIG. 7B is a diagram illustrating a protocol stack, corresponding to the packet of FIG. 7A, for BLE tunneling.

FIG. 7B is a diagram illustrating a protocol stack, corresponding to packet 700, for BLE tunneling. As illustrated, the protocol stack may include an IP/PDCP layer, which may correspond to the 3GPP packet 750. Below the IP/PDCP layer may be the BLTP layer, the BLE LL layer, and the BLE Physical (PHY) layer.

Figure 8A:
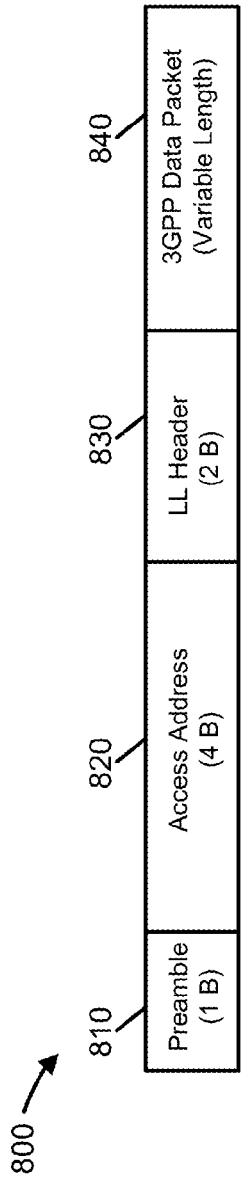
FIG. 8A is a diagram illustrating another example format of a packet transmitted over the BLE link.

FIG. 8A is a diagram illustrating an example format of a packet transmitted over the BLE link using option (2), in which each EPS bearer is assigned a different Access Address by integrated AP 132. In FIG. 8A, packet 800 may include a preamble field 810, Access Address field 820, LL header field 830, and 3GPP data packet field 840. As illustrated, preamble field 810 may be one byte in length, Access Address field 820 may be four bytes in length, LL header field 830 may be two bytes in length, and 3GPP data packet field 840 may encapsulate a variable length packet corresponding to the 3GPP data packet. Multiple Access Addresses may be assigned, by integrated AP 132, to UE 110, in which different Access Addresses may correspond to different EPS bearers associated with UE 110.

Figure 8B:
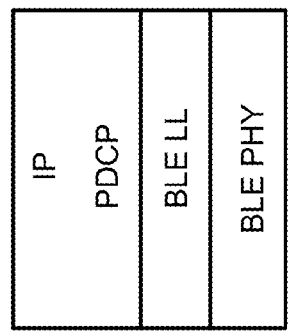
FIG. 8B is a diagram illustrating a protocol stack, corresponding to the packet of FIG. 8A, for BLE tunneling.

FIG. 8B is a diagram illustrating a protocol stack, corresponding to packet 800, for BLE tunneling. As illustrated, the protocol stack may include an IP/PDCP layer, which may correspond to the 3GPP packet 850. Below the IP/PDCP layer may be the BLE LL layer, and the BLE Physical (PHY) layer.

FIG. 9 is a diagram illustrating an example of a protocol stack using option (3), in which each EPS bearer may be assigned a unique GATT service UUID. Option (3) does not require a change to the existing BLE stack, and therefore a packet format is not illustrated for this option. As illustrated, the protocol stack may include an IP/PDCP layer, which may correspond to the 3GPP packet. Below the IP/PDCP layer may be the GATT layer.

Figure 10:
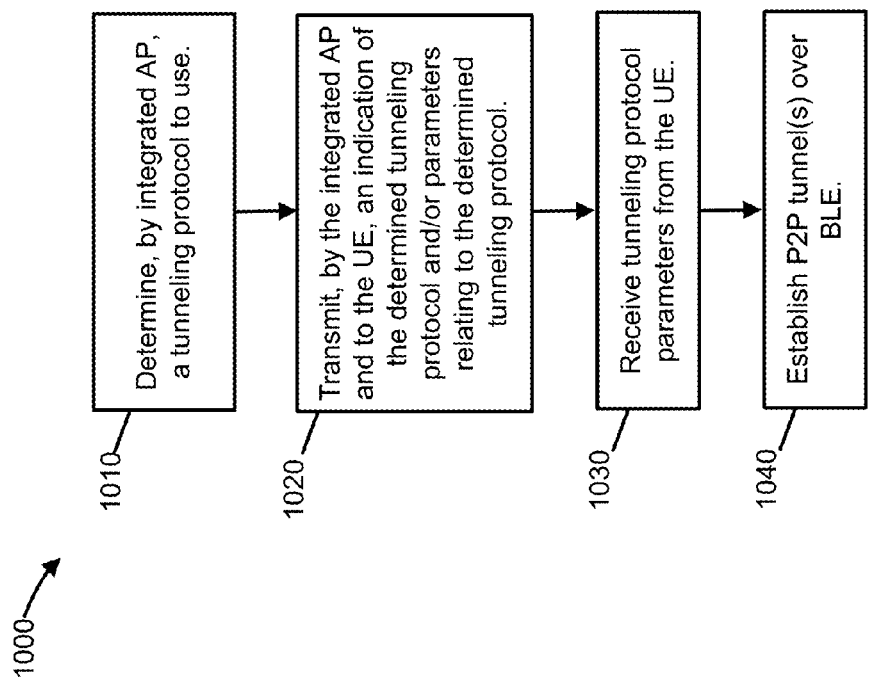
FIG. 10 is a flow chart illustrating another example process relating to supporting integrated BLE/3GPP radio access technologies.

FIG. 10 is a flow chart illustrating an example process 1000 relating to supporting integrated BLE/3GPP radio access technologies. Process 1000 may be implemented by, for example, eNB 136 or BLE AP 140 of integrated AP 132. Process 1000 may generally relate to 3GPP over BLE P2P tunneling.

Process 1000 may include determining, by the integrated AP, the tunneling protocol to use (block 1010). The tunneling protocol may correspond to the tunneling protocol packets and/or tunneling stack described with respect to FIG. 6A/6B, 7A/7B, 8A/8B, or 9. In some implementations, the tunneling protocol to use may be hardcoded or determined ahead of time for integrated AP 132. In this situation, block 1010 may be omitted.

Process 1000 may further include transmitting, by the integrated AP and to the UE, an indication of the determined tunneling protocol and/or parameters relating to the determined tunneling protocol (block 1020). The parameters may include, for example, when the tunnel protocol corresponds to option (1), in which a L2CAP CID is used to identify EPS bearers (FIGS. 6A and 6B), a per-UE Access Address and, for each bearer, an L2CAP CID and a bearer ID (e.g., dedicated bearer (DRB) ID). The L2CAP CID and the bearer ID together provide UE 110 an indication of which L2CAP CID corresponds to which bearer ID. When the tunnel protocol corresponds to option (1), in which the BLTP field is used to identify EPS bearers (FIGS. 7A and 7B), the parameters may include a per-UE Access Address. When the tunnel protocol corresponds to option (2; FIGS. 8A and 8B), in which each EPS bearer is assigned a different Access Address, the parameters may include, for each EPS bearer, the bearer ID (e.g., DRB ID) and the corresponding Access Address to use with the particular bearer ID. When the tunnel protocol corresponds to option (3), the parameters may include, for each EPS bearer, the bearer ID (e.g., DRB ID) and the corresponding GATT service UUID. In one implementation, the parameters that are exchanged, pursuant to block 1020, may be exchanged via RRC messages transmitted over the 3GPP link.

Process 1000 may further include receiving tunneling protocol parameters from the UE. (block 1030). The tunneling parameters may include, for example, the BLE device address of UE 110. In some implementations, in which the BLE device address of UE 110 has previously been transmitted to integrated AP 132, the transmission of the tunneling protocol parameters may be omitted.

Process 1000 may further include establishing the P2P tunnels over BLE (block 1040). The P2P tunnel(s) may be established using the parameters exchanged in blocks 1020 and/or 1030. The P2P tunnels may be used to encapsulate 3GPP packets in the manner discussed previously. In this manner, Bluetooth may be used to provide an additional RAT that can be used to obtain network access and offload data transfers from the 3GPP link to the Bluetooth link.

Figure 11:
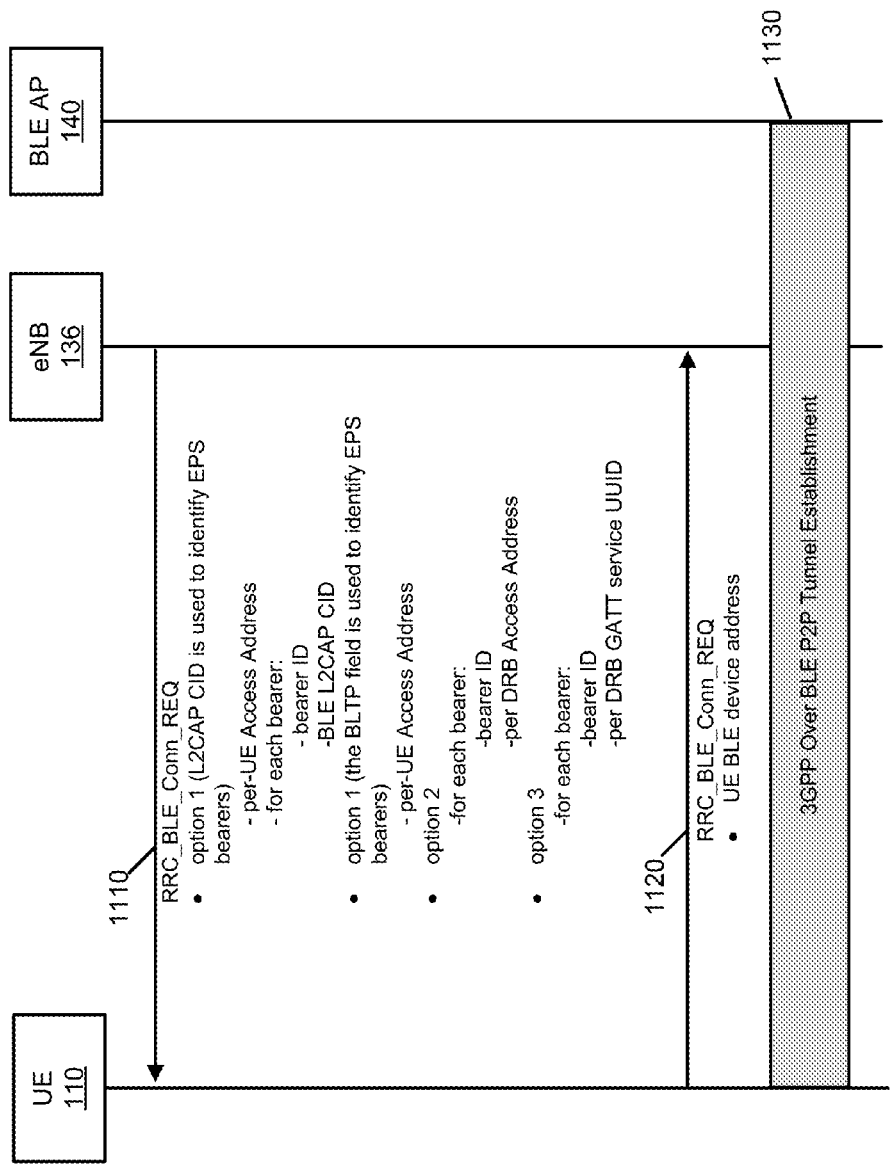
FIG. 11 is a diagram illustrating an example signal flow relating to exchanging parameters relating to establishing point-to-point tunnels.

FIG. 11 is a diagram illustrating an example signal flow relating to exchanging parameters relating to establishing the P2P tunnels over BLE. The signaling shown in FIG. 11 may be performed between eNB 136 and UE 110 using the 3GPP link. In one implementation, the signaling may be performed using RRC layer messages.

As illustrated in FIG. 11, eNB 136 may transmit BLE tunneling parameters to UE 110 (at 1110). The tunneling parameters may be included as information elements in the RRC "RRC_BLE_Conn_Req" message. The transmitted tunneling parameters may vary depending on the tunneling option being used. As illustrated, and as previously mentioned, when the tunnel protocol corresponds to option (1), in which a L2CAP CID is used to identify EPS bearers (FIGS. 6A and 6B), the parameters may include values, indicating, for each EPS bearer, the bearer ID and the corresponding L2CAP CID. The parameters may also include the per-UE Access Address that is assigned by integrated AP 132. When the tunnel protocol corresponds to option (1), in which the BLTP field is used to identify EPS bearers (FIGS. 7A and 7B), the parameters may include the per-UE Access Address. In this situation, because the bearer ID is maintained by UE 110 as part of normal operation, the bearer ID does not need to be additionally transmitted to UE 110. When the tunnel protocol corresponds to option (2), the parameters may include, for each EPS bearer, the bearer ID and the corresponding per-bearer Access Address that is assigned by integrated AP 132. When the tunnel protocol corresponds to option (3), the parameters may include, for each EPS bearer, the bearer ID and the corresponding GATT service UUID.

As is further illustrated in FIG. 11, UE 110 may transmit BLE tunneling parameters to eNB 136 (at 1120). For example, in one implementation, the transmitted tunneling parameter may include the BLE device address of integrated BLE AP 140. The parameter may be transmitted as part of the "RRC_BLE_Conn_Req" information element in the RRC layer message. eNB 136 may transmit the tunnel parameter, over link 137, to BLE AP 140.

P2P tunnels may be established between UE 110 and BLE AP 140 (at 1130). The tunnels may be used to transmit the 3GPP packet data as packets encapsulated in the manner illustrated in FIGS. 6A-9.

Figure 12:
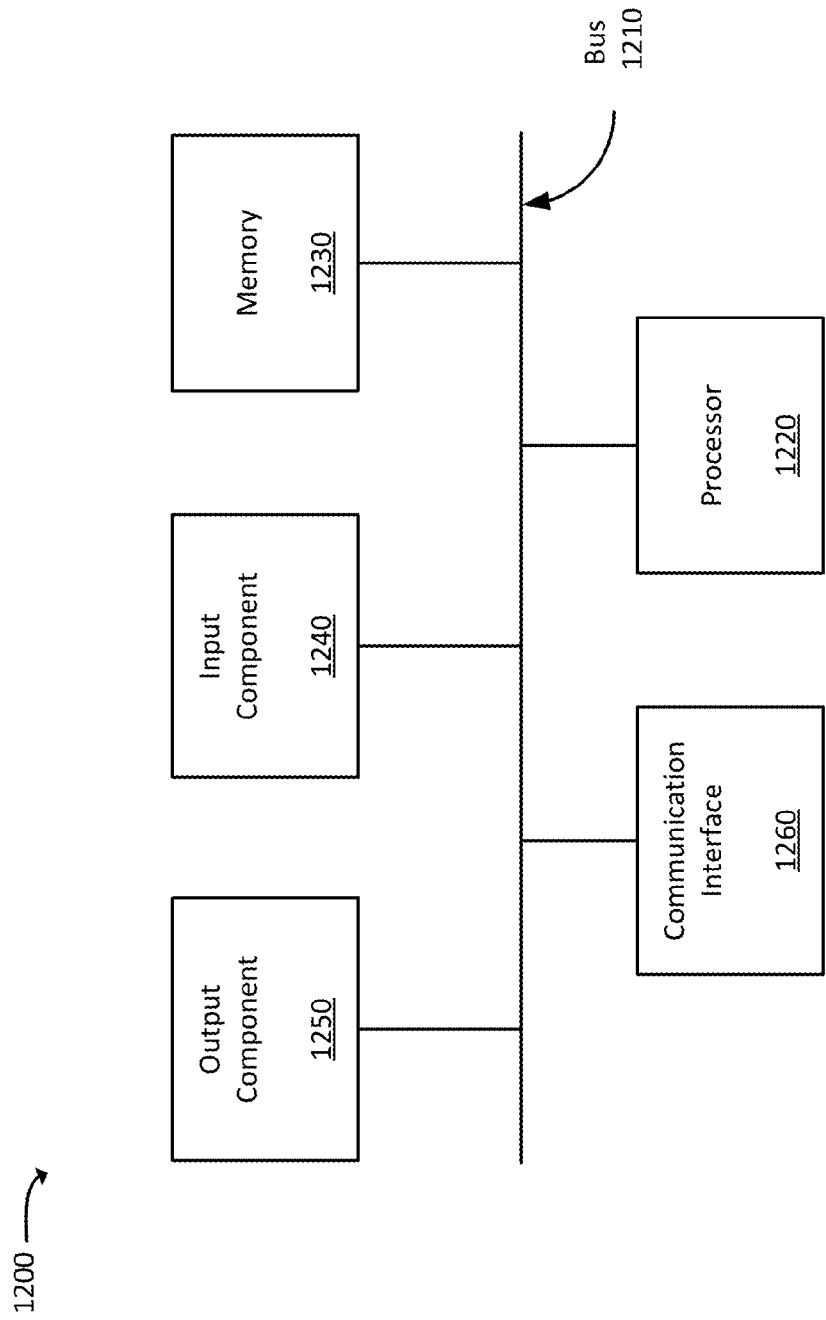
FIG. 12 is a diagram of example components of a device.

FIG. 12 is a diagram of example components of a device 1200. Some of the devices illustrated in FIG. 1 may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include processing circuitry, such as a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200, such as a keyboard, a keypad, a button, a switch, etc. Output component 1250 may include a mechanism that outputs information to the operator, such as a display, a speaker, one or more light emitting diodes (LEDs), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared (IR) receiver, a Bluetooth® radio, a WiFi radio, a cellular radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with regard to FIGS. 2, 4, and 10, the order of the signals may be modified in other implementations. Further, non-dependent signals may be performed in parallel. Similarly, while a series of communications have been described with regard to FIGS. 3, 5, and 10, the order of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. User Equipment (UE) comprising:
a first radio component to form a radio link using licensed frequency spectrum;
a second radio component to implement a Bluetooth link using unlicensed frequency spectrum; and
processing circuitry to:
receive, via the link using licensed frequency spectrum, parameters relating to discovery and pairing protocols regarding the Bluetooth link, wherein the parameters include
per evolved packet system (EPS) bearer Bluetooth Tunneling Protocol (BLTP) and Bearer identifiers;
control the second radio component, based on the received parameters, to form the Bluetooth link;
encapsulate the packets using the per EPS bearer BLTP and Bearer identifiers to identify a particular packet as belonging to a particular EPS bearer; and
transmit the encapsulated packets over the Bluetooth link to offload data transfer from the link using licensed frequency spectrum to the Bluetooth link.

2. The UE of claim 1, wherein the parameters relating to the discovery and pairing protocols are received, via the link using licensed frequency spectrum, using radio resource control (RRC) layer signaling.

3. The UE of claim 1, wherein the parameters relating to the discovery protocol additionally include an indication of an advertising start time and advertising interval applicable to a Bluetooth discovery process.

4. The UE of claim 1, wherein the parameters relating to the pairing protocol additionally include a Bluetooth 128-bit temporary key (TK).

5. The UE of claim 1, wherein the parameters relating to the pairing protocol additionally include an indication of a Bluetooth short term key (STK) generation technique.

6. The UE of claim 1, wherein the BLTP is associated with a per-UE Access Address.

7. User Equipment (UE) comprising:

a first radio component to form a radio link using licensed frequency spectrum;

a second radio component to implement a Bluetooth link using unlicensed frequency spectrum; and processing circuitry to:

receive, via the link using licensed frequency spectrum, parameters relating to discovery and pairing protocols regarding the Bluetooth link, wherein the parameters include per evolved packet system (EPS) bearer Generic Attribute Profile (GATT) service Universally Unique Identifiers (UUIDs); and encapsulate the packets using the per EPS bearer GATT service to identify a particular packet as belonging to a particular EPS bearer; and transmit the encapsulated packets over the Bluetooth link to offload data transfer from the link using licensed frequency spectrum to the Bluetooth link.

8. The UE of claim 7, wherein the parameters relating to the discovery and pairing protocols are received, via the link using licensed frequency spectrum, using radio resource control (RRC) layer signaling.

9. The UE of claim 7, wherein the parameters relating to the discovery protocol additionally include an indication of an advertising start time and advertising interval applicable to a Bluetooth discovery process.

10. The UE of claim 7, wherein the parameters relating to the pairing protocol additionally include a Bluetooth 128-bit temporary key (TK).

11. The UE of claim 7, wherein the parameters relating to the pairing protocol additionally include an indication of a Bluetooth short term key (STK) generation technique.

12. The UE of claim 7, wherein the UE is associated with a plurality of GATT services.

13. An integrated access point comprising:

a Bluetooth Low Energy (BLE) access point; and an evolved NodeB (eNB) that provides an air interface for a Wireless Wide Area Network (WWAN), the eNB being coupled to the BLE access point via a low latency interface, the eNB to:

transmit, to User Equipment (UE), parameters used in protocols associated with wireless communications performed using the BLE access point, the parameters including per evolved packet system (EPS) bearer Generic Attribute Profile (GATT) service Universally Unique Identifiers (UUIDs);

wherein the BLE access point is to:

establish a BLE link with the UE based on the transmitted parameters; and receive, over the established BLE link, BLE packets that encapsulate WWAN packets using the per EPS bearer GATT service to identify a particular packet as belonging to a particular EPS bearer.

14. The integrated access point of claim 13, wherein the received BLE packets include information identifying bearer traffic flows associated with the WWAN.

15. The integrated access point of claim 13, wherein the parameters relate to BLE discovery and pairing protocols.

16. The integrated access point of claim 15, wherein the parameters are transmitted via radio resource control (RRC) layer signaling.

17. The integrated access point of claim 15, wherein the parameters relating to the discovery protocol include an indication of an advertising start time and advertising interval applicable to a BLE discovery process.

18. The integrated access point of claim 15, wherein the parameters relating to the pairing protocol include a BLE 128-bit temporary key (TK).

19. The integrated access point of claim 13, wherein the parameters relating to the pairing protocol additionally include an indication of a Bluetooth short term key (STK) generation technique.

20. The integrated access point of claim 13, wherein the UE is associated with a plurality of GATT services.

* * * * *